(12) United States Patent
Simon

(10) Patent No.: US 6,294,985 B1
(45) Date of Patent: Sep. 25, 2001

(54) REMOTELY TRIGGERED COLLISION AVOIDANCE STROBE SYSTEM

(76) Inventor: Jeffery M. Simon, 695 Lake Dr., Lithonia, GA (US) 30058

( * ) Notice: Subject to any disclaimer, the term of this patent is extended or adjusted under 35 U.S.C. 154(b) by 0 days.

(21) Appl. No.: 09/368,655

(22) Filed: Aug. 5, 1999

Related U.S. Application Data

(63) Continuation-in-part of application No. 09/161,635, filed on Sep. 28, 1998.

(51) Int. Cl.$^7$ .................................................. B60Q 1/00
(52) U.S. Cl. ................... 340/435; 340/539; 340/825.49; 340/332; 116/28 R; 116/209; 116/173
(58) Field of Search .................................... 340/435, 539, 340/825.49, 825.36; 116/28 R, 209, 173

(56) References Cited

U.S. PATENT DOCUMENTS

| | | |
|---|---|---|
| 3,944,972 | 3/1976 | Chandler . |
| 4,115,757 | 9/1978 | Blahunka . |
| 4,127,844 | 11/1978 | Purdy ...................................... 340/71 |
| 4,249,159 | 2/1981 | Stasko . |
| 4,357,594 | 11/1982 | Ehrlich et al. .......................... 340/72 |
| 4,464,648 | 8/1984 | Smith et al. . |
| 4,483,683 | 11/1984 | Alley, Sr. . |
| 4,723,078 | 2/1988 | Neuffer et al. . |
| 4,775,865 | 10/1988 | Smith et al. . |
| 4,843,337 | 6/1989 | Conn, Jr. et al. . |
| 4,849,735 | 7/1989 | Kirtley et al. . |
| 4,983,953 | 1/1991 | Page ...................................... 340/467 |
| 4,990,886 | 2/1991 | Stanulis ................................ 340/467 |
| 5,017,904 | 5/1991 | Browne et al. ....................... 340/479 |
| 5,043,698 | 8/1991 | Tabacchi .............................. 340/467 |
| 5,111,181 | 5/1992 | Priesemuth ........................... 340/467 |
| 5,148,147 | 9/1992 | Kobres ................................. 340/464 |
| 5,235,329 | 8/1993 | Jackson . |
| 5,309,141 | 5/1994 | Mason et al. ......................... 340/467 |
| 5,319,352 | 6/1994 | Robertson et al. . |
| 5,345,218 | 9/1994 | Woods et al. ........................ 340/479 |
| 5,387,898 | 2/1995 | Yeheskel et al. ..................... 340/479 |
| 5,392,203 | 2/1995 | Harris, Jr. . |
| 5,422,638 | 6/1995 | Singer et al. . |
| 5,461,362 | 10/1995 | Echt ..................................... 340/467 |
| 5,481,243 | 1/1996 | Lurie et al. .......................... 340/467 |
| 5,510,763 | 4/1996 | Deckard et al. ..................... 340/431 |
| 5,555,454 | 9/1996 | Dees . |
| 5,565,841 | 10/1996 | Pandohie ............................. 340/479 |
| 5,606,310 | * 2/1997 | Egger et al. ......................... 340/479 |
| 5,640,138 | 6/1997 | Hinkley et al. . |
| 5,760,686 | 6/1998 | Toman . |
| 5,874,892 | 2/1999 | Antonellis et al. . |
| 5,933,081 | * 8/1999 | Jones ................................... 340/539 |
| 5,933,099 | * 8/1999 | Mahon ................................. 340/961 |

* cited by examiner

*Primary Examiner*—Daryl Pope
(74) *Attorney, Agent, or Firm*—Barry E. Kaplan, Esq.; Hughes & Kaplan

(57) ABSTRACT

Disclosed is an aircraft collision avoidance system having remote triggering means, multicolored lamp display, audible alarm, and a stroboscopic light for providing adequate early warning to an aircraft tug operator and other surrounding individuals that a possible emergency situation may exist. The system comprises four assemblies: (1.) a portable unit; (2.) a tug unit; (3.) a station unit; and, (4.) one or more hand wand transmitters. The station unit comprises a strobe light mounted to a building or gate and is positioned so as to be visible by a tug operator and flightcrew. The tug unit comprises an audible alarm mounted within the tug vehicle which is audible to the tug operator when triggered and a highly visible strobe light. The portable unit comprises an audible alarm that sounds when triggered and a highly visible strobe light. The portable unit may be utilized in place of the tug unit or may be utilized in conjunction with the tug unit at other positions, depending on the degree of warning needed. Each watch person carries a hand wand transmitter which he manually activates in case of impending collision or other emergency. The hand wand transmitter generates a radio frequency signal that is detected by a receiving circuitry contained within the portable unit, the tug unit and the station unit, thereby activating the respective alarming systems of each unit to warn the tug operator and others that an emergency situation exists and that all movement should cease.

31 Claims, 8 Drawing Sheets

REMOTELY TRIGGERED COLLISION AVOIDANCE STROBE SYSTEM

RELATED APPLICATIONS

This application is a continuation-in-part of application Ser. No. 09/161,635 filed on Sep. 28, 1998.

FIELD OF THE INVENTION

This invention relates generally to motor vehicle hazard warning systems; and, more particularly, to an improved remotely triggered collision avoidance strobe system.

BACKGROUND OF THE INVENTION

During the movement of aircraft and other large machinery, equipment, trucks and boats, the line of sight of tug operators is typically limited. As such, many individuals may be employed to help direct and warn tug operators of impending collisions. However, prior art devices and methods have been disadvantageous in adequately controlling these expensive and sometimes fatal mistakes. For instance, in the airline industry, aircraft, in the United States alone, are tugged from gates and hangers many times per day. In addition to the numerous on-the-job injuries that result due to tug related accidents, millions of dollars are lost each day when an aircraft inadvertently collides with other aircraft, service vehicles or buildings. Costly repairs, inspections, investigations, flight delays, lost revenues, lost passenger confidence and employee injuries make the avoidance of such collisions of utmost importance.

In the airline industry, wing walkers typically are positioned near the wings with flags or poles to direct and warn the tug operator of impending collisions. However, due to the noise and limited sight, it is often difficult for the tug operators to observe these wing walkers simultaneously and to quickly respond to any verbal or hand signals. Thus, numerous accidents have resulted from this method of collision avoidance.

Although there have been devices invented that assist the pilot in docking or parking a plane (e.g., U.S. Pat. No. 4,249,159 to Stasko and U.S. Pat. No. 4,464,648 to Smith et al.), none are designed to, or serve the function of, preventing collisions while moving aircraft via tug vehicles.

It has been recognized for many years that flashing lights have the ability to draw attention more rapidly than a constantly emitted light. Recognizing this, others have provided collision avoidance systems utilizing flashing lights, triggered by various activation means, to draw the attention of surrounding drivers. It is often the case that standard incandescent lamps are utilized as the light-emitting source. Examples of such systems may be found by reference to U.S. Pat. No. 5,510,763 to Deckard et al. Such systems are disadvantageous in that the light is not bright enough to draw attention during daylight; don't flash rapidly enough; high failure rate relative to the number of flashes required. Sometimes the flashing light is hidden behind red or amber lenses or utilizes the preexisting red brake lights or amber hazard lights, reducing effectiveness by reducing overall brightness. Examples of such systems may be found by reference to U.S. Pat. No. 5,565,841 to Pandohie; U.S. Pat. No. 5,510,763 to Deckard et al.; U.S. Pat. No. 5,043,698 to Tabacchi; U.S. Pat. No. 5,017,904 to Browne et al.; U.S. Pat. No. 4,357,594 to Ehrlich et al.; U.S. Pat. No. 5,148,147 to Kobres; U.S. Pat. No. 5,461,362 to Echt; U.S. Pat. No. 5,387,898 to Yeheskel et al.; U.S. Pat. No. 5,345,218 to Woods et al.; U.S. Pat. No. 5,111,181 to Priesemuth; and, U.S. Pat. No. 5,017,904 to Browne et al.

It has been recognized that stroboscopic lighting, or strobes, may be utilized in vehicle safety systems. Because these lamps are brilliant, often 100,000 candles or more, they may be seen over bright sunlight. In addition, they may be set to flash rapidly, thereby naturally attracting the attention of the human eye and increasing the likelihood of detection by human peripheral vision. Furthermore, the rate of flashing and the intensity may be varied by design to optimize their signaling capability.

In recent years, the motor vehicle industry, departments of transportation, and various other public agencies have undertaken to incorporate stroboscopic lighting in their system specifications. For example, buses, four-way stop lights, and emergency response vehicles utilize strobe lights to aid in providing early warning of various emergency or dangerous conditions.

Thus, there is a clear advantage in utilizing stroboscopic light, appropriately triggered to indicate potentially dangerous situations.

It is readily apparent that an improved stroboscopic remote collision avoidance system easily adaptable to preexisting systems and having the capability to be triggered from a multitude of remote advantage points in the event of impending collision is needed to aid in preventing, or at least reducing, the incidence of accidental injuries to both persons and property of the type just described. It is, therefore, to the provision of such an improved that the present invention is directed.

BRIEF SUMMARY OF THE INVENTION

In accordance with the several objects of this invention, presented is a new and improved collision avoidance system having remote triggering means, multicolored lamp display, audible alarm, and a stroboscopic light for providing adequate early warning to a tug or aircraft operator and other surrounding individuals that a possible emergency situation may exist.

The invention comprises, generally, four subsystems: (1.) a portable unit; (2.) a tug unit; (3.) a station unit; and, (4.) one or more hand wand transmitters. In the preferred embodiment, the station unit comprises a collision avoidance strobe light mounted to a building or other structure (i.e., a gate) and positioned so as to be visible by flight crew. The tug unit comprises an audible alarm mounted within the tug vehicle, which is audible to the tug operator when triggered, and a collision avoidance strobe light. The portable unit, similar to the tug-mounted unit, also comprises an audible alarm that sounds when triggered and a collision avoidance strobe light. The portable unit may be utilized in place of the tug unit or may be utilized in conjunction with the tug unit at other positions, depending upon the degree of warning needed.

In a preferred embodiment, each watch person (i.e., wing walker) carries a hand wand transmitter which he or she manually activates in case of impending collision or other emergency. The hand wand transmitter generates a radio frequency signal that is detected by a receiving circuitry contained within the portable unit, the tug unit and the station unit thereby generating an internal signal within each of said units. These internal signals activate the respective alarming systems of each unit to warn the tug operator and others that an emergency situation exists and that all movement should cease. For instance, in the station unit, the internal signal activates a flash tube and a red parking light. In the portable unit and the tug unit, the respective internal signals activate an audible alarm and a flash tube in each unit.

In use, a watch person presses a button on the hand wand when he perceives a threat of collision or other impending emergency, thereby activating the audible alarms and the flash tubes of the portable unit and the tug unit, and the flash tube and the red parking light of the station unit. The brilliance and rapid flashing of the flash tubes, coupled with the audible alarms and red light, quickly captures the tug or aircraft operator's attention thus resulting in the immediate stopping of all movement, and the adequately warning of others in the area of an emergency situation.

As an additional precaution and assistance in movement of aircraft, boats, trucks, large machinery and equipment, a push button control is connected to the station unit wherein one of a series of colored lights and the flash tube can be selectively activated manually via one of a plurality of push buttons to indicate a variable level of warning. For instance, if all is clear, the depressing of the fourth push button will activate a green light to indicate to a tug operator, pilot, driver, captain or other individuals that all is clear. As the level of concern increases, the third button may be depressed to activate a yellow light indicating that caution should be exercised. When the aircraft, boat, truck or equipment is in the proper position, all buttons can be released and a red light will be activated. A signal received from a hand wand, as discussed above, overrides the push button controls to immediately activate the red light and the flash tube.

A feature and advantage of the present invention is to provide a new and improved remotely activated collision avoidance strobe system that can be triggered by a multitude of individuals positioned in a plurality of advantaged viewing points.

Another feature and advantage of the present invention is to provide a new and improved remotely activated collision avoidance strobe system that incorporates a high intensity strobe light that is highly visible.

Another feature and advantage of the present invention is to provide a new and improved remotely activated collision avoidance strobe system that has both audible and visual warning indicators.

Another feature and advantage of the present invention is to provide a new and improved remotely activated collision avoidance strobe system that incorporates a multicolored status light display.

Another feature and advantage of the present invention is to provide a new and improved remotely activated collision avoidance strobe system that is activated via a radio frequency signal having a code randomly and automatically selected from one of a plurality of codes.

Another feature and advantage of the present invention is to provide a new and improved remotely activated collision avoidance strobe system having a portable unit capable of being charged and recharged.

Another feature and advantage of the present invention is to provide a new and improved remotely activated collision avoidance strobe system having a push button control unit for selectively activating one of a multitude of colored lamps and/or flash tube.

Another feature and advantage of the present invention is to provide a new and improved remotely activated collision avoidance strobe system having a station unit, tug unit and portable unit capable of receiving an encoded radio frequency.

Other objects, features, and advantages of the present invention will become apparent to those skilled in the art by reference to the drawings and to the detailed description of the preferred embodiments presented herein.

BRIEF DESCRIPTION OF THE DRAWINGS

The invention is better understood by reading the Detailed Description of the Preferred Embodiments with reference to the accompanying drawing figures, in which like reference numerals denote similar structure and refer to like elements throughout, and in which.

It is to be noted that the drawings presented are intended solely for the purpose of illustration and that they are, therefore, neither desired nor intended to limit the invention to any or all of the exact details of construction shown, except insofar as they may be deemed essential to the claimed invention.

DETAILED DESCRIPTION OF THE PREFERRED EMBODIMENT

In describing preferred embodiments of the present invention, illustrated in FIGS. 1–6, specific terminology is employed for the sake of clarity. The invention, however, is not intended to be limited to the specific terminology so selected, and it is to be understood that each specific element includes all technical equivalents, which operate in a similar manner to accomplish a similar purpose.

Figure 1:
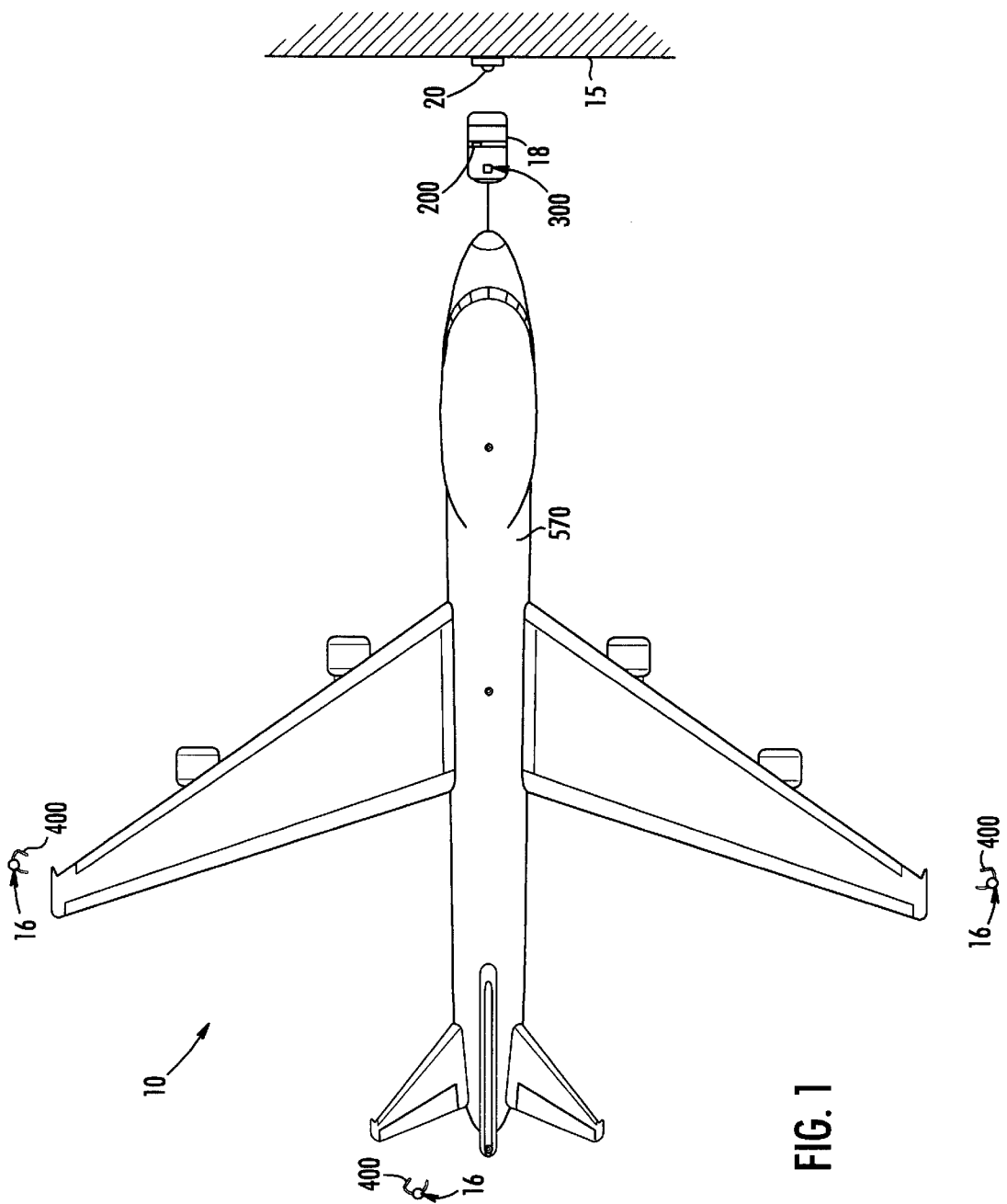
FIG. 1 is an aerial view of a preferred embodiment of the present invention in use in an aircraft application.

Referring now to FIG. 1, there is shown a preferred embodiment of the present invention indicated generally by reference numeral 10, as used in an aircraft application. Generally, device 10 comprises preferably station unit 20, tug unit 200, portable unit 300, and hand wands 400. As described more fully below, tug unit 200 and portable unit 300 may be used separately or in combination, depending on the degree of warning needed.

Figure 2:
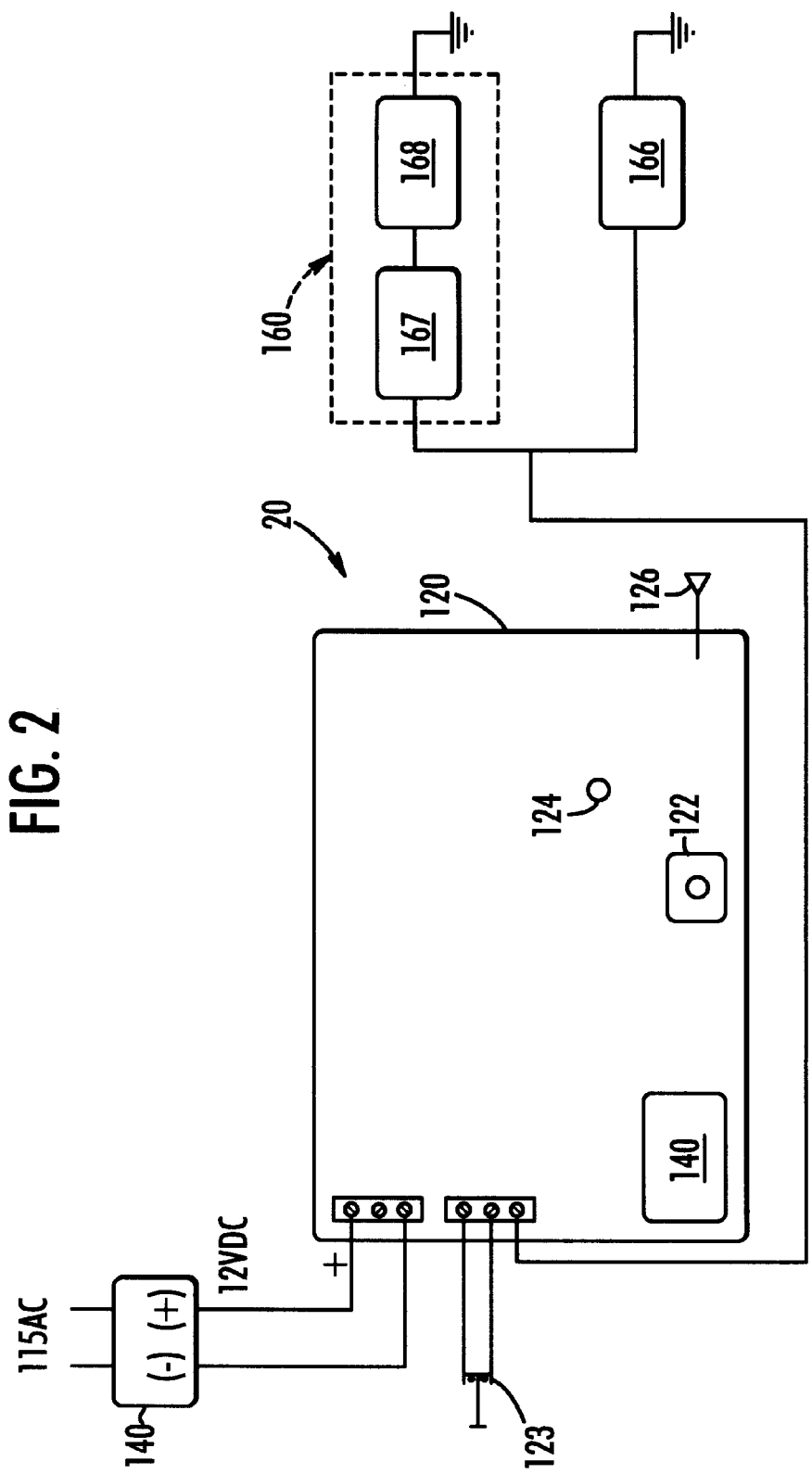
FIG. 2 is a schematic diagram of the station unit of a preferred embodiment of the present invention.
Figure 2A:
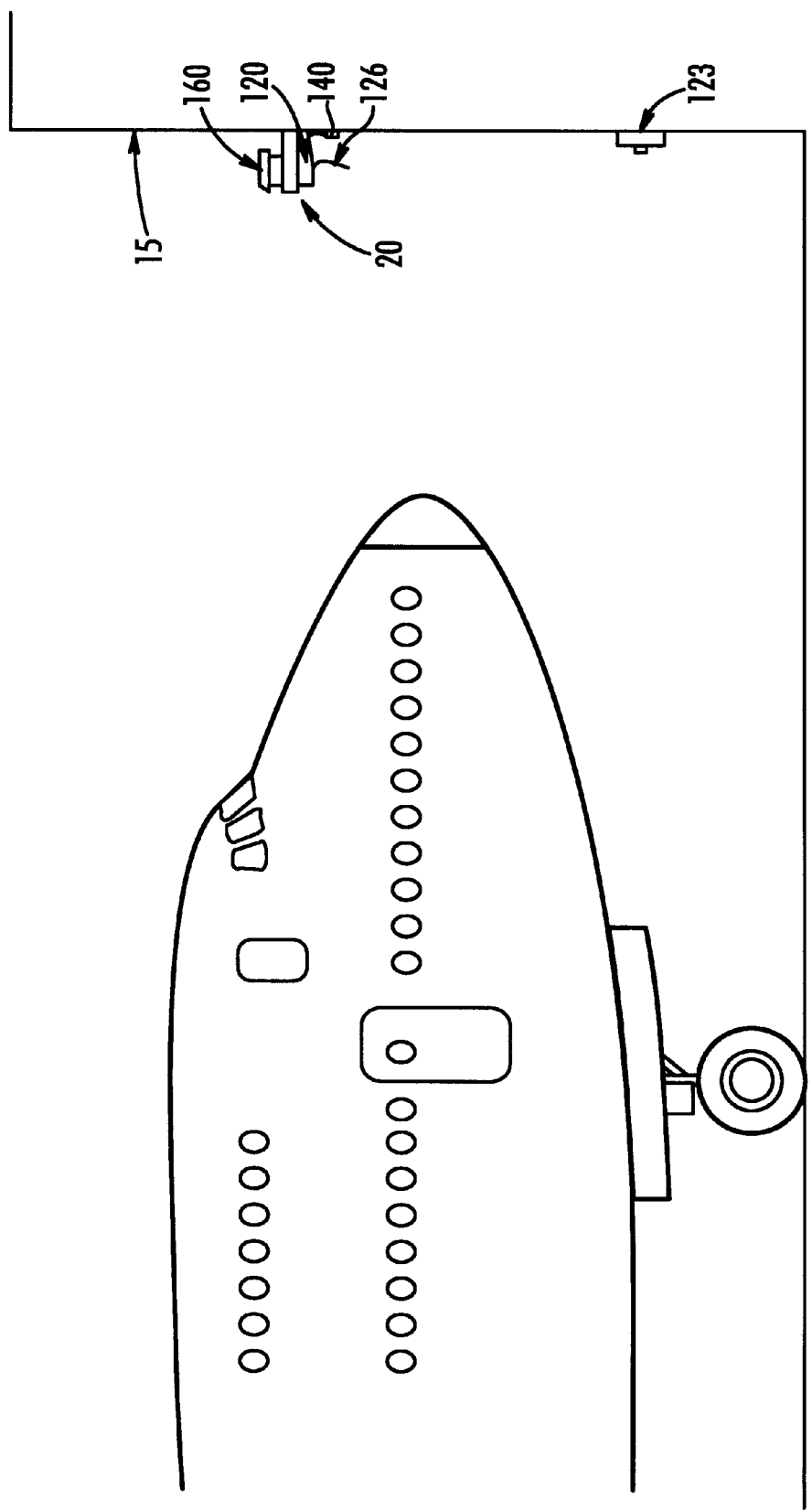
FIG. 2A is a side view of the station unit of a preferred embodiment of the present invention.

Referring now to FIGS. 2 and 2A, station unit is mounted on gate 15 and comprises receiver 120, powered by transformer 140, a wall mounted reset switch 123 and collision avoidance strobe alarm 160 as disclosed in application Ser. No. 09/161,635 filed on Sep. 28, 1998. Operation is identical to the operation tug unit 200 with the exception station unit is powered by transformer 140.

Figure 3:
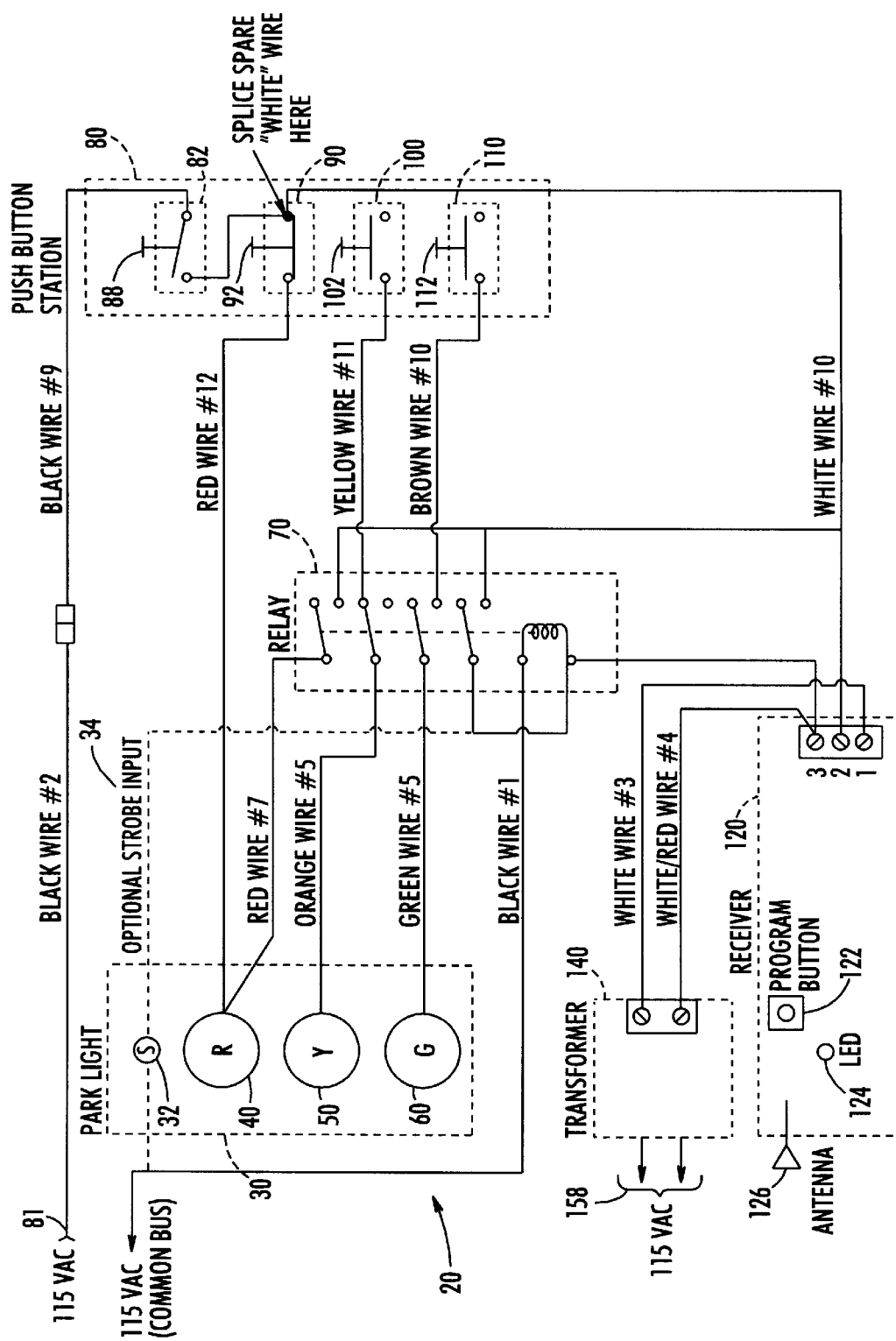
FIG. 3 is a schematic diagram of the station unit of a alternate embodiment of the present invention incorporated into a multicolored parking status light.
Figure 6:
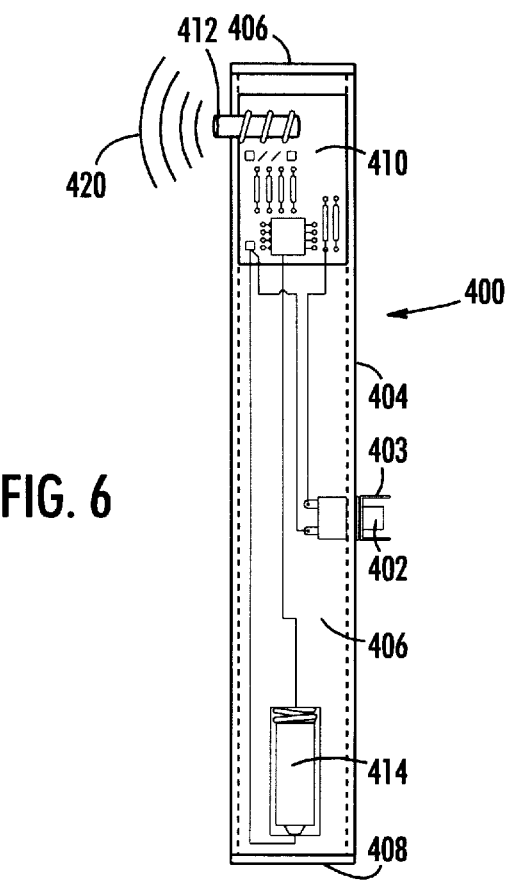
FIG. 6 is a schematic diagram of the hand wand of a preferred embodiment of the present invention.

Referring now to FIG. 3, station unit 20 comprises in its alternate embodiment incorporating a park light system, generally, lamp assembly 30, relay circuit 70, push-button controls 80, receiver 120 and transformer 140. Receiver 120 via antenna 126 receives and recognizes encoded radio frequency signal 420 generated by hand wand 400, as illustrated in FIG. 6 and further discussed below. When encoded radio frequency signal 420 is detected by receiver 120, indicating an emergency situation, receiver 120 generates a signal that trips relay circuit 70, thus allowing current to flow from power source 81 to red lamp 40 of lamp assembly 30, thereby illuminating red lamp 40. Additionally, said signal also allows current to flow through stroboscopic circuit 34, as disclosed in application Ser. No. 09/161,635 filed on Sep. 28, 1998. Stroboscopic circuit 34 amplifies the signal and generates an oscillating/pulse current to rapidly charge and discharge flash tube 32 of lamp assembly 30 to generate a highly visible warning indicator.

In a preferred embodiment, program button 122 and LED display 124 are positioned on receiver 120 to provide a means for programming encoded radio frequency signal 420 from hand wands 400. When program button 122 is initially pressed, LED display 124 will blink. When hand wand 400 is activated during this temporary period, if receiver 120 is properly receiving said signal, LED display 124 will stay lit. If hand wand 400 is again activated during this period, LED display 124 will go out, thus indicating to the user that receiver 120 and hand wand 400 are properly programmed.

Push-button control 80 comprises, preferably, four push buttons 82, 90, 100, 110. Push button 90 connects between receiver 120 and red lamp 40 and is generally in a closed position to allow red lamp to be activated in its initial state. Push button 90 serves as a pass-through control to allow current to flow to red lamp 40. Push button 82 is connected to current source 81 and is open in its initial state. Push button 82 acts as an on/off switch and a reset switch in the event encoded radio frequency signal 420 is received thus overriding push-button control 80. To indicate that all is clear, an operator presses button 92 of push button 90 to deactivate red lamp 40, and at the same time, he presses button 112 of push button 110 thus allowing current to flow through relay circuit 70 and to green lamp 60 of lamp assembly 30 thereby illuminating green lamp 60. Alternatively, to indicate that movement should proceed with caution, an operator presses button 92 of push button 90 to deactivate red lamp 40, and at the same time, he presses button 102 of push button 100 thus allowing current to flow through relay circuit 70 and to yellow lamp 50 of lamp assembly 30 thereby illuminating yellow lamp 50. When the aircraft or other object is in its proper position (i.e., gate unloading) or if the operator of push-button control 80 wishes for all movement to cease, he simply releases all buttons and red lamp 40 will be illuminated. When encoded radio frequency signal 420 is detected by receiver 120, indicating an emergency situation, all controls to push-button control 80 are removed when relay 70 removes all power to green lamp 60 and yellow lamp 50 and bypasses push button 90.

Figure 4:
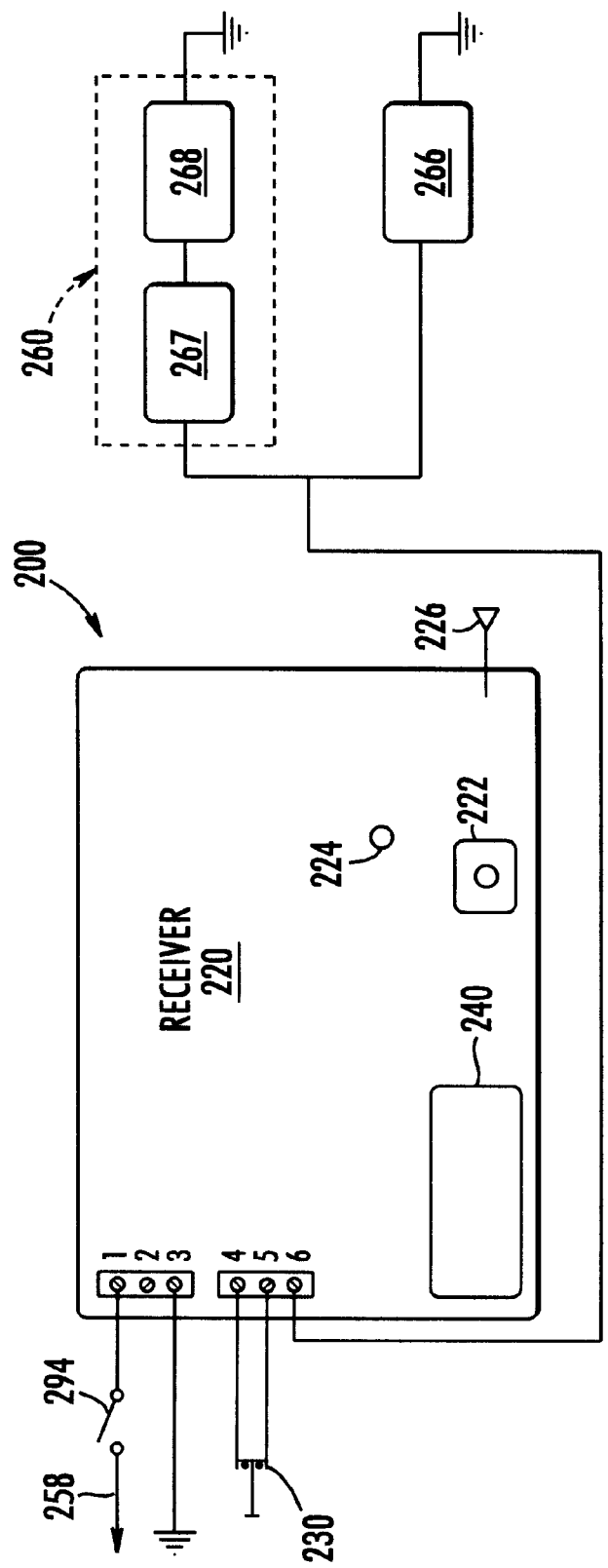
FIG. 4 is a schematic diagram of the tug unit of a preferred embodiment of the present invention.
Figure 4A:
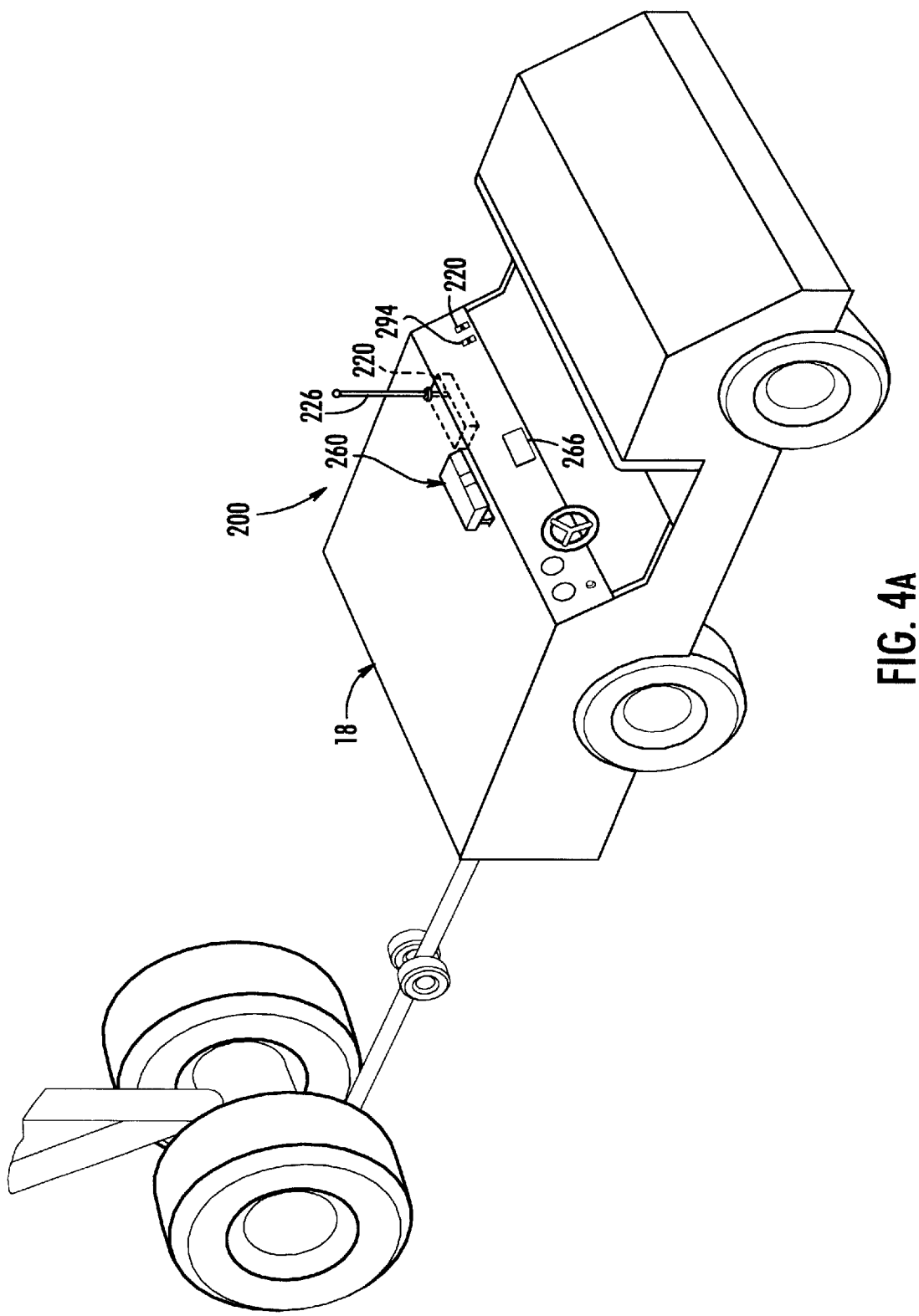
FIG. 4A is an aerial view of a preferred embodiment of the present invention in use in a jet tug application.

Referring now to FIGS. 4 and 4A, tug unit 200 is mounted within tug 18 and in close proximity to the tug operator. Tug unit 200 is powered by the tug's 18 electrical system 258. Tug unit 200 comprises, generally, power switch 294, receiver 220, reset switch 230, latching relay 240, alarm unit 260, and audible unit 266. Receiver 220, similar to receiver 120 of station unit 20, receives and distinguishes encoded radio frequency 420 from hand wand 400. When encoded radio frequency 420 is received by receiver 220, a signal is generated that flows to latching relay 240, thereby resulting in the latching or closing of the circuit. DC voltage from the tug 18 electrical system 258 will supply power to the receiver via the ignition system. Said current travels through latching relay 240 and to audible alarms 266 of alarm unit 260. Additionally, said current flows through stroboscopic circuit 267, as disclosed in application Ser. No. 09/161,635 filed on Sep. 28, 1998, thereby amplifying the current and generating an oscillating/pulsed current to rapidly charge and discharge flash tubes 268 of alarm unit 260.

In operation, tug unit 200 is turned on by power switch 294 connected between receiver 220 and electrical system 258. After encoded radio frequency signal 420 is transmitted by hand wand 400, antenna 226 of receiver 220 receives said signal and generates an internal signal that trips latching relay 240 and allows current to flow to audible alarms 266 and flash tubes 268. The combination of audible alarms 266 and rapidly flashing flash tubes 260 immediately alerts the tug operator that an emergency situation is present and that all movement should cease. After the emergency situation has been remedied, the tug operator can reset latching relay 240 to the open position, and, thus, tug unit 200, by pressing reset switch 230 connected to latching circuit 240.

In a preferred embodiment, program button 222 and LED display 224 are positioned on receiver 220 to provide a means for programming hand wands 400. When program button 222 is initially pressed, LED display 224 will blink. When hand wand 400 is activated during this temporary period, if receiver 220 is properly receiving said signal, LED display 224 will stay lit. If hand wand 400 is again activated during this period, LED display 224 will go out, thus indicating to the user that receiver 220 and hand wand 400 are properly programmed.

Figure 5:
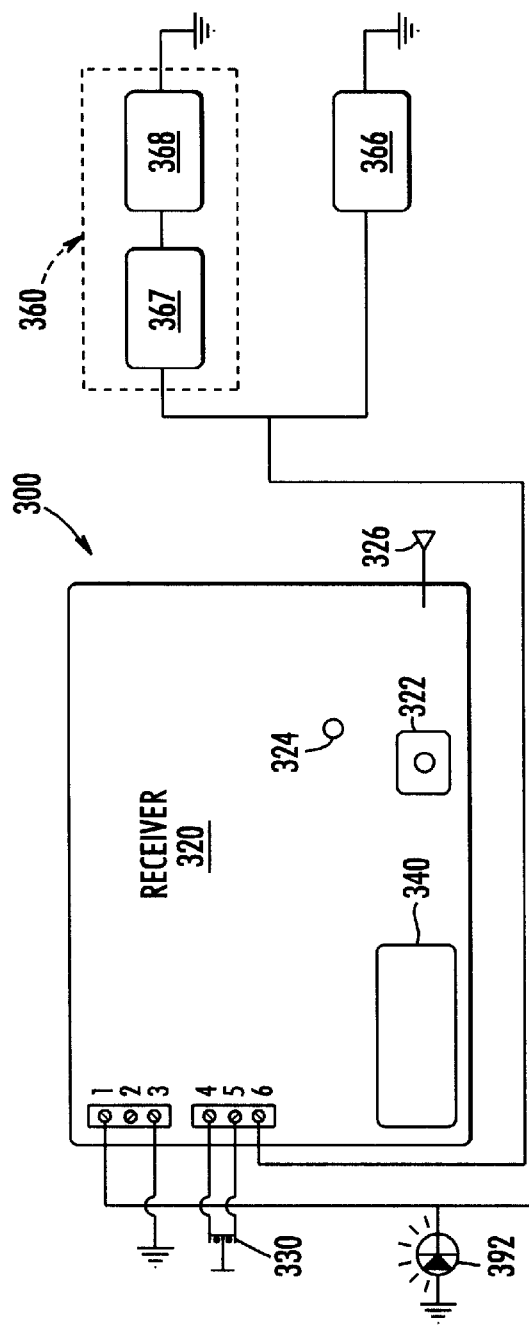
FIG. 5 is a schematic diagram of the portable unit of a preferred embodiment of the present invention.
Figure 5:
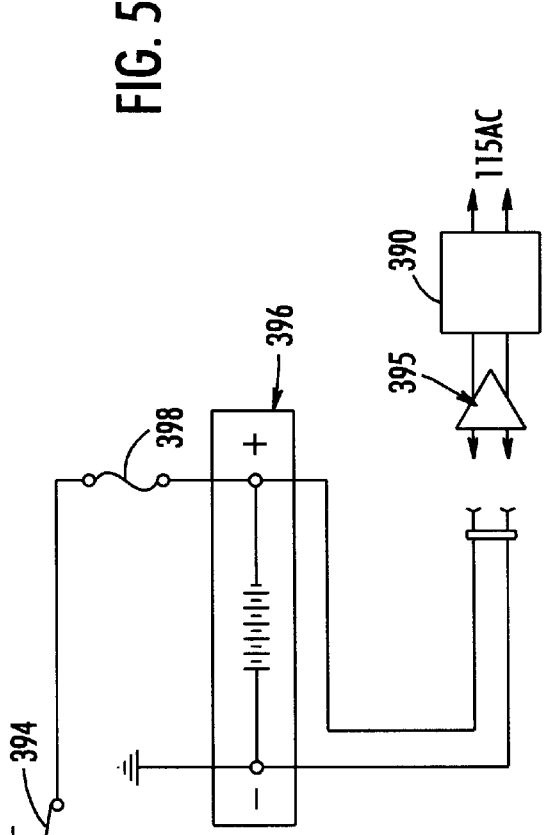
Figure 5A:
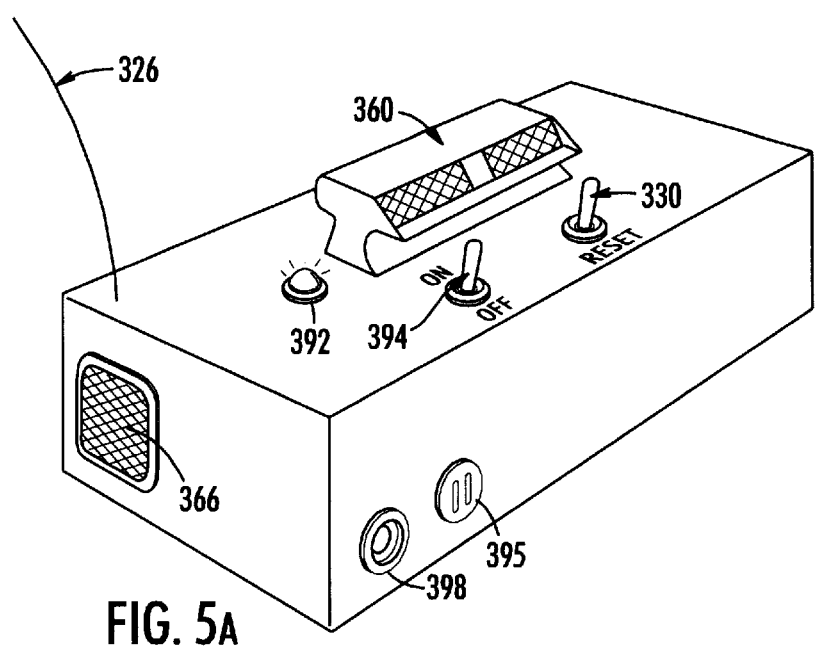
FIG. 5A is a side view of the portable unit of a preferred embodiment of the present invention.

Referring now to FIG. 5, portable unit 300 is identical to tug unit 200 in all aspects except that portable unit 300 operates from a rechargeable battery 396 and thus comprises these additional elements, charger 390, charge socket 395, rechargeable battery 396, and LED indicator 392. The negative terminal of rechargeable battery 396 is grounded, and the positive terminal of rechargeable battery 396 is connected inline with fuse 398 and power switch 394. LED indicator 392 is connected down-stream of power switch 394 and illuminates when portable unit 300 is on or active. To charge portable unit 300, the male end of charge socket 395, connected to rechargeable battery 396, is inserted into the female end of charge socket 395, connected to charger 390. Charger 390 can be one of many well-known chargers having the appropriate charging output for rechargeable battery 396. Preferably, charger 390 will have two lamp or LED indicators that will illuminate when rechargeable battery 396 is charging and one indicator will turn off when rechargeable battery 396 is fully charged. Other means to indicate that rechargeable battery 396 is fully charged is suitable. Preferably, portable unit 300 is enclosed in a waterproof container.

In operation, similar to tug unit 200, power switch 394 is placed in the on position. When encoded radio frequency signal 420 is transmitted from hand wand 400, antenna 326 of receiver 320 detects said signal thus generating an internal signal that trips latching circuit 340 to the closed position thereby allowing current to flow through latching relay 340 and to audible alarm 366 of alarm unit 360. Additionally, current travels through stroboscopic circuit 367, as disclosed in application Ser. No. 09/161,635 filed on Sep. 28, 1998, thereby amplifying the current and generating an oscillating/pulsed current to rapidly charge and discharge flash tubes 368 of alarm unit 360. The combination of audible alarms 366 and rapidly flashing flash tubes 368 immediately alerts the tug operator that an emergency situation is present and that all movement should cease. After the emergency situation as been remedied, the tug operator can reset latching circuit 340 to the open position, and thus portable unit 300, by pressing reset switch 330 connected to latching circuit 340.

In a preferred embodiment, program button 322 and LED display 324 are positioned on receiver 320 to provide a means for programming the hand wands 400. When program button 322 is initially pressed, LED display 324 will blink. When hand wand 400 is activated during this temporary period, if receiver 320 is properly receiving said signal, LED display 324 will stay lit. If hand wand 400 is again activated during this period, LED display 324 will go out; thus, indicating to the user that receiver 320 and hand wand 400 are properly programmed.

Referring now to FIG. 6, hand wand 400, comprises, generally, elongated casing 404, antenna 412, end cap 408, push button 402, button guard 403, transmitter circuit 410, electrical potting compound 406, and battery 414. Transmitter circuit 410 and battery 414 are contained within elongated casing 404, and elongated casing 404 is sealed on each end by electrical potting compound 406, and end cap 408. Extending from the interior of elongated casing 404 through openings therethrough are antenna 412 and push button 402. Battery 414 is connected to transmitter circuit 410 and provides the power source for transmitter circuit 410. The overall weight and dimension of hand wand 400, preferably, is such that it may be easily held in one hand.

Transmitter circuit 410, preferably, is of the type found in the INTELLICODE garage door opener system sold by GENIE. However, any transmitter system may be utilized that generates an encoded radio frequency signal. Receivers 120, 220 and 320 found in station unit 20, tug unit 200 and portable unit 300, respectively, are preferably of the type found in the INTELLICODE garage door opener system sold by GENIE. However, any receiver system may be utilized that can receive and recognize an encoded radio frequency signal.

In use, a watch person holds hand wand 400 in one hand with his finger near push button 402 so that in the event of an emergency he may quickly have access to push button 402. Button guard 403 surrounds push button 402 to reduce the risk of accidental activation. In the event of an impending collision or other emergency situation, watch person presses push button 402, thus allowing current to flow from battery 414 to transmitter 410. Transmitter 410 generates and broadcast encoded radio frequency 420 via antenna 412. Encoded radio frequency 420 is then detected by receivers 120, 220 and/or 320 and the respective alarms are activated, as described above, to warn the tug operator and others that an emergency situation exist and that all movement should immediately cease.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A remotely triggered collision avoidance system for ground-based aircraft traffic control operations, comprising:
   (a.) a hand unit comprising an aircraft marshalling hand wand for carrying by an operator proximate to the traffic control operations, said hand unit being additionally capable of generating and broadcasting a signal in response to an emergency situation upon activation by the operator, said hand unit further comprising an elongated casing, a power source, a signal transmitter circuit, an antenna, and, a means for activating said signal transmitter circuit;
   (b.) means for detecting said signal; and,
   (c.) means cooperatively associated with said detection means for warning individuals near said warning means of a possible collision, wherein said warning means is responsive to said detection means.

2. The remotely triggered collision avoidance system of claim 1, wherein said signal comprises a radio frequency signal.

3. The remotely triggered collision avoidance system of claim 1, wherein said warning means comprises an audible alarm.

4. The remotely triggered collision avoidance system of claim 1, wherein said warning means comprises a stroboscopic light.

5. The remotely triggered collision avoidance system of claim 1, wherein said warning means comprises an audible alarm and a stroboscopic light.

6. The remotely triggered collision avoidance system of claim 1, wherein said signal generating means generates an encoded radio frequency signal and broadcasts said encoded radio frequency signal a distance over the airwaves surrounding said signal generating means.

7. The remotely triggered collision avoidance system of claim 6, wherein said signal detection means receives said encoded radio frequency signal and generates a second signal in response to said detection, and wherein said warning means is responsive to said second signal.

8. A remotely triggered collision avoidance system for ground-based aircraft traffic control operations, comprising;
   (a.) a hand unit comprising an aircraft marshalling hand wand for carrying by an operator proximate to the traffic control operations, said hand unit being additionally capable of generating and broadcasting a signal in response to an emergency situation upon activation by the operator, said hand unit further comprising an elongated casing, a power source, a signal transmitter circuit, an antenna, and, a means for activating said signal transmitter circuit;
   (b.) means for detecting said signal;
   (c.) an alarm cooperatively associated with said detection means; and,
   (d.) an optional means for producing a stroboscopic light cooperatively associated with said detection means;
   wherein said alarm and said optional stroboscopic light means are responsive to said signal.

9. The remotely triggered collision avoidance system of claim 8, wherein said signal comprises a radio frequency signal.

10. The remotely triggered collision avoidance system of claim 9, wherein said signal generating means generates an encoded radio frequency signal and broadcasts said encoded radio frequency signal a distance over the airwaves surrounding said signal generating means.

11. The remotely triggered collision avoidance system of claim 10, wherein said signal detection means receives said encoded radio frequency signal and generates a second signal in response to said detection, and wherein said alarm and said optional stroboscopic light means are responsive to said second signal.

12. The remotely triggered collision avoidance system of claim 8, wherein said stroboscopic light means comprises an amplifying circuit, an oscillating circuit and a flash tube connected together, wherein said signal is amplified via said amplifying circuit and said amplified signal is pulsed via said oscillating circuit thereby rapidly charging and discharging said flash tube.

13. A remotely triggered collision avoidance system for providing warning to flight crew within ground-based aircraft traffic control operations, comprising:

(a.) a hand unit comprising an aircraft marshalling hand wand for carrying by an operator proximate to the traffic control operations, said hand unit being additionally capable of generating and broadcasting a signal in response to an emergency situation upon activation by the operator, said hand unit further comprising an elongated casing, a power source, a signal transmitter circuit, an antenna, and, a means for activating said signal transmitter circuit; and, (b.) a station unit, said station unit comprising means for receiving said signal and means for warning the flight crew in response to said signal that an impending collision is possible and that all movement should cease.

14. The remotely triggered collision avoidance system of claim 13, wherein said signal comprises a radio frequency signal.

15. The remotely triggered collision avoidance system of claim 14, wherein said radio frequency signal generating and broadcasting means encodes said signal and randomly selects from a plurality of codes on each transmission.

16. The remotely triggered collision avoidance system of claim 13, wherein said signal generating means generates an encoded radio frequency signal and broadcasts said encoded radio frequency signal a distance over the airwaves surrounding said signal generating means.

17. The remotely triggered collision avoidance system of claim 16, wherein said signal receiving means receives said encoded radio frequency signal and generates a second signal in response to said receipt, and wherein said warning means is responsive to said second signal.

18. The remotely triggered collision avoidance system of claim 13, wherein said warning means of said station unit comprises a red light and an optional stroboscopic lighting means.

19. The remotely triggered collision avoidance system of claim 18, wherein said warning means of said station unit further comprises a manually activated yellow and green light, wherein if all is clear, said green light is activated and if caution is needed, said yellow light is activated.

20. A remotely triggered collision avoidance system for providing warning to a tug operator within ground-based aircraft traffic control operations, comprising:

(a.) a hand unit comprising an aircraft marshalling hand wand for carrying by an operator proximate to the traffic control operations, said hand unit being additionally capable of generating and broadcasting a signal in response to an emergency situation upon activation by the operator, said hand unit further comprising an elongated casing, a power source, a signal transmitter circuit, an antenna, and, a means for activating said signal transmitter circuit; and, (b.) a tug unit, said tug unit comprising means for receiving said signal and means for warning the tug operator in response to said signal that an impending collision is possible and that all movement should cease.

21. The remotely triggered collision avoidance system of claim 20, wherein said signal comprises a radio frequency signal.

22. The remotely triggered collision avoidance system of claim 21, wherein said radio frequency signal generating and broadcasting means encodes said signal and randomly selects from a plurality of codes on each transmission.

23. The remotely triggered collision avoidance system of claim 21, wherein said signal generating means generates an encoded radio frequency signal and broadcasts said encoded radio frequency signal a distance over the airwaves surrounding said signal generating means.

24. The remotely triggered collision avoidance system of claim 23, wherein said signal receiving means receives said encoded radio frequency signal and generates a second signal in response to said receipt, and wherein said warning means is responsive to said second signal.

25. The remotely triggered collision avoidance system of claim 20, wherein said warning means of said tug unit comprises an alarm and an optional stroboscopic lighting means.

26. A remotely triggered collision avoidance system for providing warning to a Lug operator within ground-based aircraft traffic control operations, comprising:

(a.) a hand unit comprising an aircraft marshalling hand wand for carrying by an operator proximate to the traffic control operations, said hand unit being additionally capable of generating and broadcasting a signal in response to an emergency situation upon activation by the operator, said hand unit further comprising an elongated casing, a power source, a signal transmitter circuit, an antenna, and, a means for activating said signal transmitter circuit; and, (b.) a portable unit, said portable unit comprising means for receiving said signal and means for warning a tug operator in response to said signal that an impending collision is possible and that all movement should cease.

27. The remotely triggered collision avoidance system of claim 26, wherein said signal comprises a radio frequency signal.

28. The remotely triggered collision avoidance system of claim 27, wherein said radio frequency signal generating and broadcasting means encodes said signal and randomly selects from a plurality of codes on each transmission.

29. The remotely triggered collision avoidance system of claim 27, wherein said signal generating means generates an encoded radio frequency signal and broadcasts said encoded radio frequency signal a distance over the airwaves surrounding said signal generating means.

30. The remotely triggered collision avoidance system of claim 29, wherein said signal receiving means receives said encoded radio frequency signal and generates a second signal in response to said receipt, and wherein said warning means is responsive to said second signal.

31. The remotely triggered collision avoidance system of claim 26, wherein said warning means of said portable unit comprises an alarm and an optional stroboscopic lighting means.

* * * * *